United States Patent [19]

Bouiller et al.

[11] 4,363,445

[45] Dec. 14, 1982

[54] THRUST-VECTORING NOZZLE FOR JET PROPULSION SYSTEM

[75] Inventors: Jean G. Bouiller, Brunoy; Jacques A. J. Pous, Le Mee sur Seine; Raymond J. M. Joubert, Savigny sur Orge, all of France

[73] Assignee: Societe Nationale d'Etude et de Construction de Moteurs d'Aviation, "S.N.E.C.M.A.", Paris, France

[21] Appl. No.: 209,986

[22] Filed: Nov. 24, 1980

[30] Foreign Application Priority Data

Nov. 23, 1979 [FR] France ................................ 79 29208

[51] Int. Cl.³ ............................................ B64C 15/06
[52] U.S. Cl. ................................ 239/265.35; 267/152
[58] Field of Search ...................... 239/265.35, 265.43, 239/265.23; 267/152, 153; 308/2 R, 2 A, 26; 285/45, 227, 228, 235

[56] References Cited

U.S. PATENT DOCUMENTS

| 3,090,198 | 5/1963 | Zeisloft | 239/265.35 |
| 3,094,072 | 6/1963 | Parilla | 239/265.35 X |
| 3,182,452 | 5/1965 | Eldred | 239/265.35 X |
| 3,390,899 | 7/1968 | Herbert | 239/265.35 X |
| 3,504,903 | 4/1970 | Irwin | 267/1 |
| 3,696,999 | 10/1972 | Desjardins et al. | 239/265.35 |
| 4,219,156 | 8/1980 | Schwaerzler | 239/265.35 |

FOREIGN PATENT DOCUMENTS

| 1192058 | 1/1966 | Fed. Rep. of Germany | 239/265.35 |
| 2639474 | 2/1976 | Fed. Rep. of Germany | 239/265.35 |
| 2199578 | 7/1973 | France | 239/265.35 |
| 2408037 | 11/1977 | France | 239/265.35 |

Primary Examiner—John J. Love
Assistant Examiner—Gene A. Church
Attorney, Agent, or Firm—Oblon, Fisher, Spivak, McClelland & Maier

[57] ABSTRACT

A multidirectional thrust-vectoring device for a nozzle, including a fixed and pivoting part. The device includes elastic elements constituting a flexible articulation. The elastic elements form two elastic planes, the first of which is fixed on the fixed part and the second on the pivoting part. The elements are assembled in twos by means of a connecting plate and are distributed in two sets of two elements each on the periphery of the nozzle. Jacks associated with each two-set group allow the nozzle to be turned in the direction desired.

11 Claims, 11 Drawing Figures

THRUST-VECTORING NOZZLE FOR JET PROPULSION SYSTEM

BACKGROUND OF THE INVENTION

1. Field of the Invention

The invention concerns a thrust-vectoring nozzle for a jet propulsion system including a fixed part solid with the propulsion system on which is articulated a pivoting part, a sealing member arranged between the two parts, and jacks controlling the movement of the pivoting part.

2. Description of the Prior Art

The criteria for agility required of modern military planes sometimes forces the air-frame designer to have recourse to means other than aerodynamic control surfaces in order to achieve rapid trim changes.

One of the most effective means is to provide the jet with a thrust-vectoring nozzle making it possible to achieve, depending on the deflection component selected, either a lateral sideslip of the craft or a rapid tail downward movement without a correlative increase in drag due to the lifting of the elevons. However, nozzles steerable on all axes require either a double articulation or a single articulation and a rotating connection. These devices are cumbersome and pose delicate tightness problems.

U.S. Pat. No. 3,182,452 gives a simple and relatively noncumbersome realization of a rocket nozzle. The chamber outlet creates a wide spherical boss against which a corresponding spherical boss provided on the nozzle slides. Tightness is assured by a hollow O-ring having an open circular section, the edges of the section being fixed onto the chamber and the nozzle. Rotation of the nozzle is obtained by four jacks arranged according to the perpendicular diameters of the chamber and the nozzle.

The shape and size of the chamber outlet allow correct centering and holding of the nozzle, which is not the case with propulsion systems and airplane nozzles in which the diameters of the fixed nozzle and the mobile nozzle are essentially equal.

SUMMARY OF THE INVENTION

The invention is aimed at achieving a single steerable nozzle that is not too cumbersome and the centering of which is automatically achieved through the design of its steering device.

The steerable nozzle, according to the invention, for a jet propulsion system including a fixed part solid with the propulsion system on which is articulated a pivoting part, a tightening mechanism arranged between the two parts, and jacks for controlling movement of the pivoting part is remarkable in that it includes a multidirectional steering device having separated elastic elements arranged between the fixed part and the pivoting part of the nozzle.

According to one form of realization, the multidirectional steering device at the edge of the nozzle, one of the ends of the elastic elements being integral with an intermediate connection ring, the other end of the elements being fixed onto the fixed part and the mobile part of the nozzle.

The two-element sets form a flexible articulation consisting essentially of two planes of elastic elements, the first of which is fixed onto the fixed part and the second onto the pivoting part of the nozzle.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
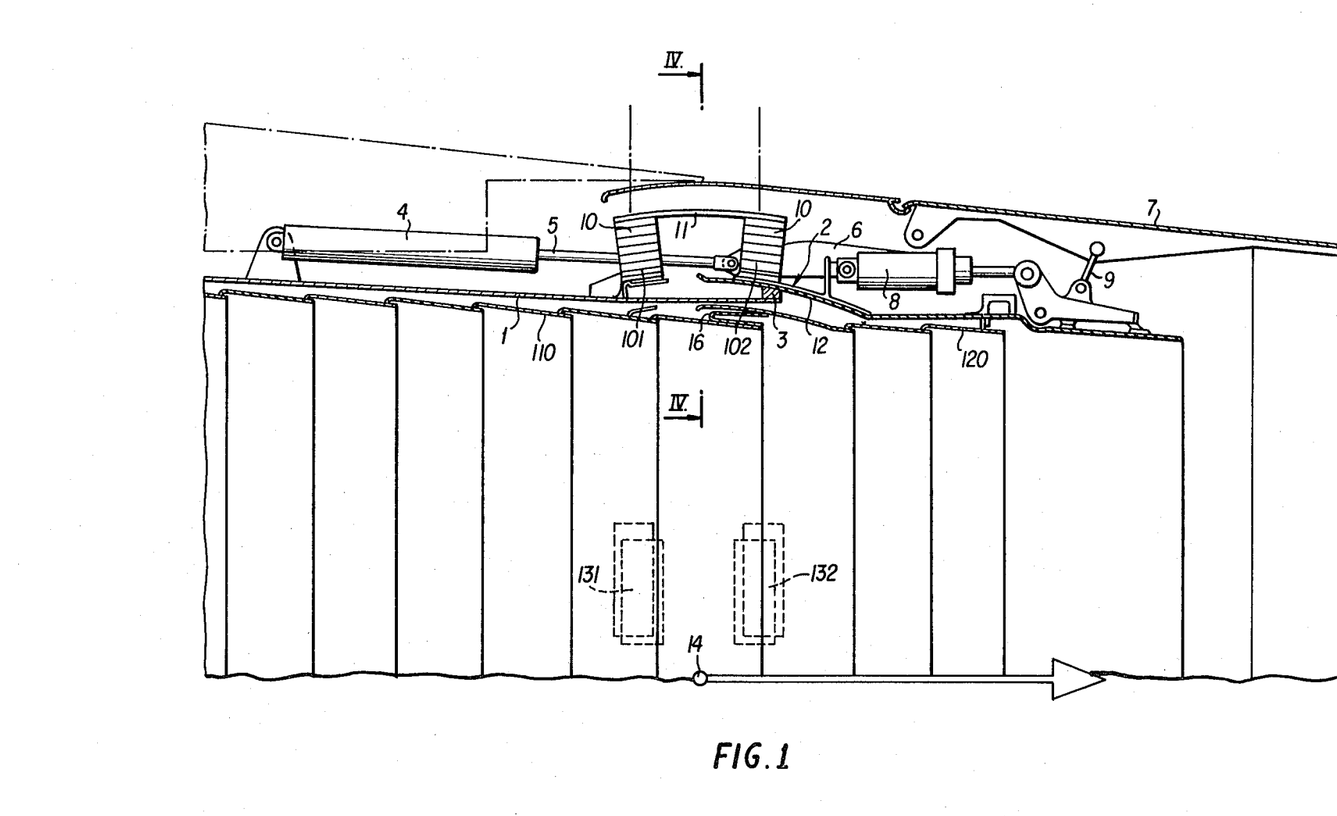
FIG. 1 is a partial longitudinal section of a steerable propulsion system nozzle according to a first embodiment of the invention, the axis of the steerable nozzle being in the axis of the propulsion system.

FIG. 1 shows a partial section of a thrust-vectoring nozzle according to one embodiment of the invention. The jet engine or propulsion system (not shown) is extended by a nozzle in which one part 1, or ejection duct, is fixed, and a pivoting part 2. Tightening mechanisms 3 and 16 are arranged between the pivoting part 2 and the fixed part 1 is provided.

The pivoting part is steered by means of shifting jacks 4, the body of which is mounted on the fixed part 1 of the nozzle, while the shafts of the jacks cooperate with extensions 6 fixed directly or indirectly onto the pivoting part 2. In the embodiment shown, the nozzle is equipped with a device for modifying the section of the jet, one flap 7 of which is shown. This flap is itself controlled independently of the pivoting part by jacks 8 and rods 9.

The extensions 6 of the beam, bearing the jacks 8, fixed to the pivoting part 2 of the nozzle, carry an axle on which is articulated the end of the jack 4 shafts. The multidirectional steering device, according to one characteristic of the invention, consists of elastic elements 10. These elastic elements are grouped in twos at the ends of an intermediate collar 11. The free ends are fixed respectively onto the fixed part 1 and the pivoting part 2 of the nozzle. Sets as described are uniformly distributed at the circumference of the nozzle.

Three sets distributed at 120° are sufficient to assure centering and holding of the pivoting part 2 in relation to the fixed part 1.

Figure 4:
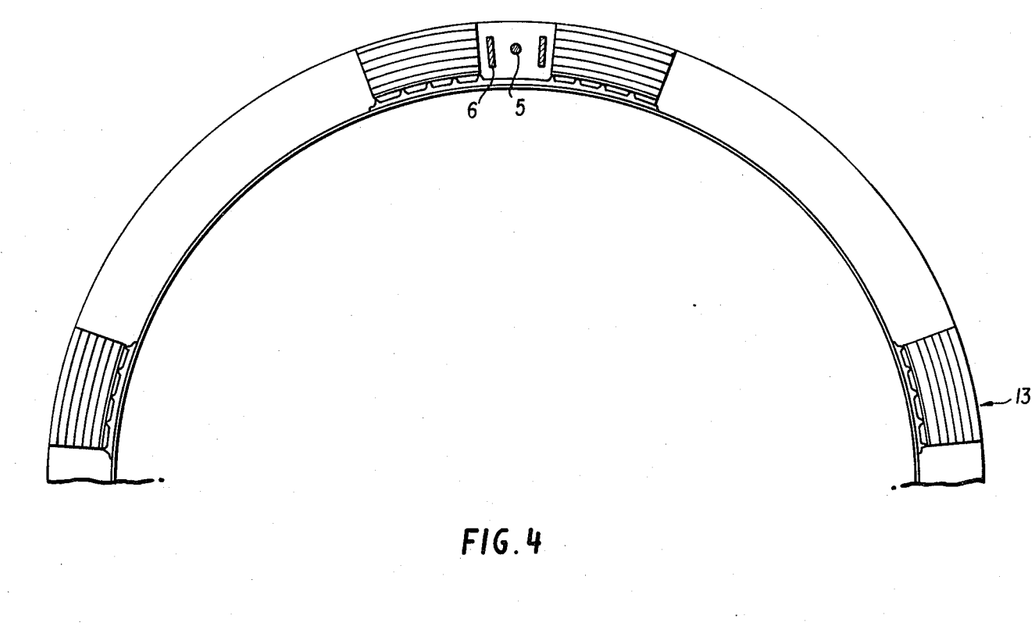
FIG. 4 is a partial half-section along IV—IV in FIG. 1.

According to the form shown, four double sets of elastic elements have been arranged, for which FIG. 4 gives the approximate arrangement. Each control jack is associated with such a double set and is arranged in a diametric plane of the nozzle, equidistant from each set.

The multidirectional steering device forms a flexible articulation consisting of two planes I and II of elastic elements (FIG. 1) of which the first row according to I is fixed onto the ejection duct 1 and the second row according to II is fixed on the mobile part 2. The axis of symmetry of the elastic elements 101 and 102 of a set are cut at a point located on the engine axis. FIG. 1 shows the elements 131 and 132 of the set 13 in FIG. 4.

According to the form of realization shown in FIGS. 1 to 4, the tightening mechanism includes a collar 3 in the form of a spherical zone belonging to the periphery of the end of the fixed part and cooperating with the spherical edge 12 of part 2. The face of the collar and the spherical edge have the same radii and curvature centers.

In addition, a complementary tightening mechanism 16 is provided consisting of a metal annular plate curved into a U borne by the far edge of the sleeve 110 of the duct of the fixed part, providing an elastic support and sliding on the sleeve 120 of the duct of the mobile part. This mechanism is intended to preserve the supply of the cooling films of the sleeve.

Other tightening mechanisms could be placed between the fixed and mobile parts of the nozzle, either as an alternative or as a complement to those illustrated here. An example of these complementary tightening mechanisms will be discussed in the description of the second embodiment hereinbelow.

The elastic articulation created by the double sets perfectly centers the pivoting part 2 on the fixed part 1 which takes on all transversal loads.

Axial loads, for example the drag of the nozzle, are taken up by the four jacks 4 (only one being shown), the shafts 5 of which pass between the elastic elements and are fixed onto the extensions 6 of the beams, supporting the jacks 8 in the manner previously described. According to a preferred embodiment, the jacks 4 are screw jacks while allow precise positioning of the spherical pivoting part 2 of the nozzle around its center 14.

Figure 2:
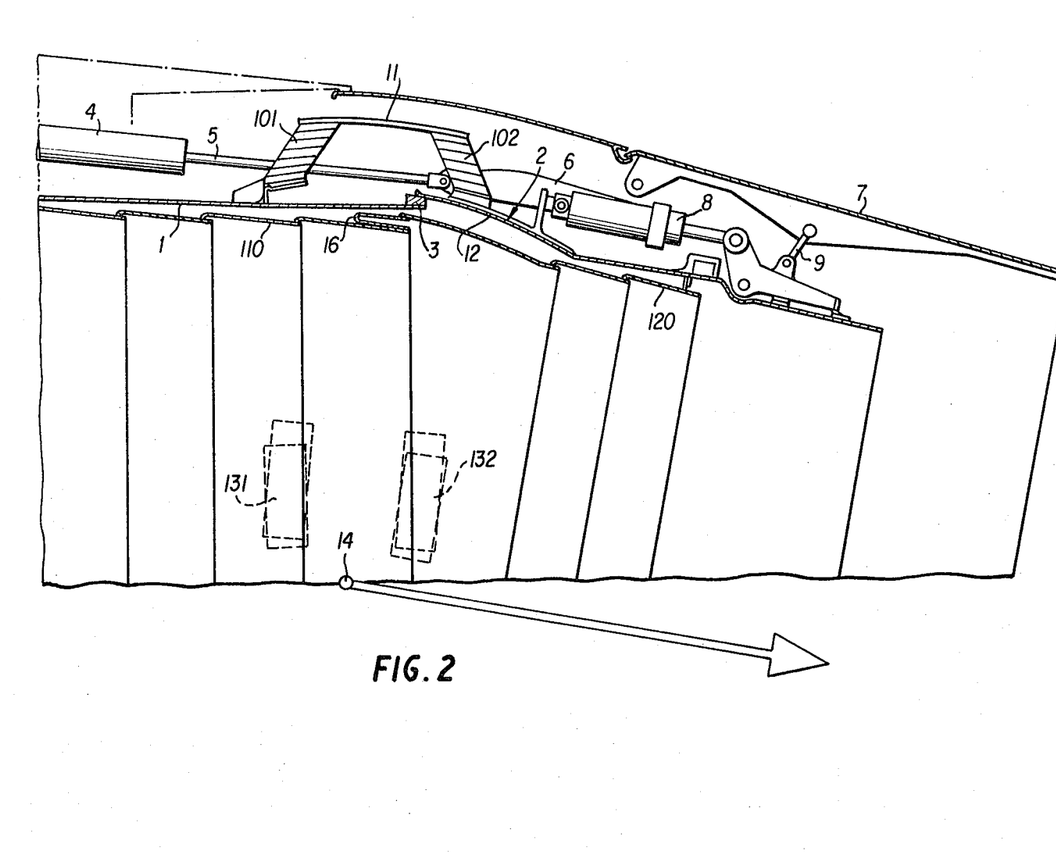
FIG. 2 is a partial longitudinal section of a steerable nozzle in a position such that the jet is turned downward.
Figure 3:
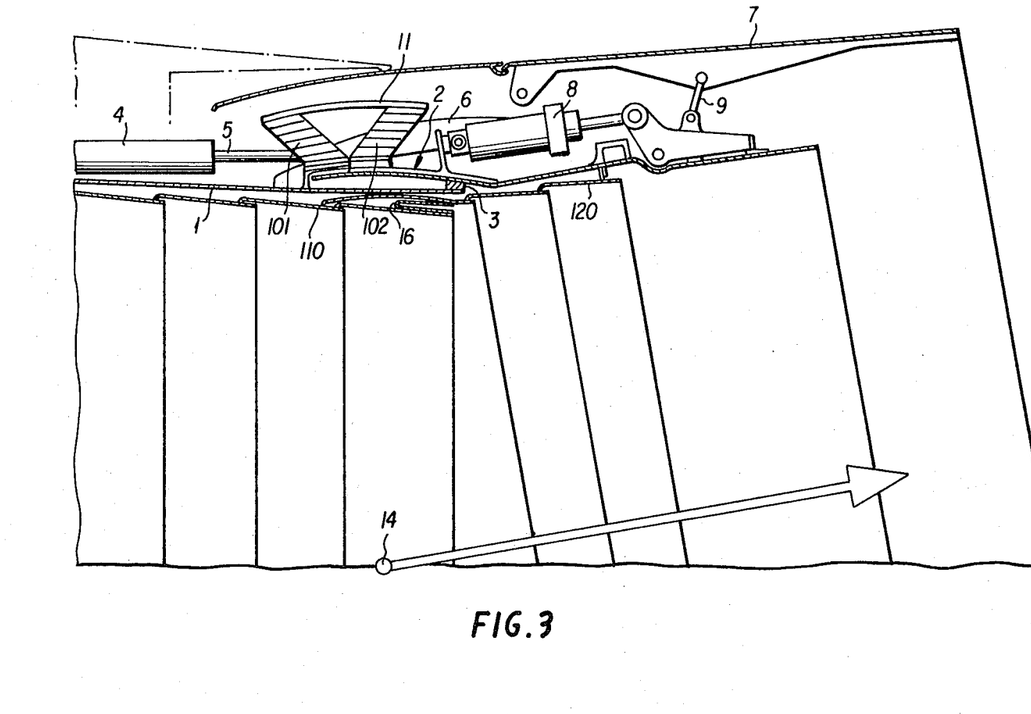
FIG. 3 is a partial longitudinal section of a steerable nozzle in a position such that the jet is turned upward.

FIGS. 2 and 3 show the multidirectional steering device for turning the jet downward or upward. The set of elastic elements 101, 102 undergoes a twist in which the ends fixed onto the ejection duct 1 and the mobile part 2 separate. The diametrically opposite sets undergo a stress which results in bringing the ends together. The sets arranged at 90° and 131 and 132 of the set 13 undergo a twist shown in FIG. 9.

FIG. 3 shows the twist of the set 101-102. The diametrically opposite set undergoes a contrary twist, that is, a separation entirely similar to that of the elements 101-102 in FIG. 2. The twist of the elements in the radial planes has not been represented, this being easily deductible from the representation of the elements 131-132 in FIG. 2, the twist taking place in the opposite direction.

The elastic elements consist according to one embodiment of stacked rubber and light-alloy plates, vulcanized so that the rubber adheres perfectly to the metal. These components are selected so that their heat resistance is greater than the temperature in the environment of the nozzle. They are in the form of portions having a cylindrical sector.

Figure 6:
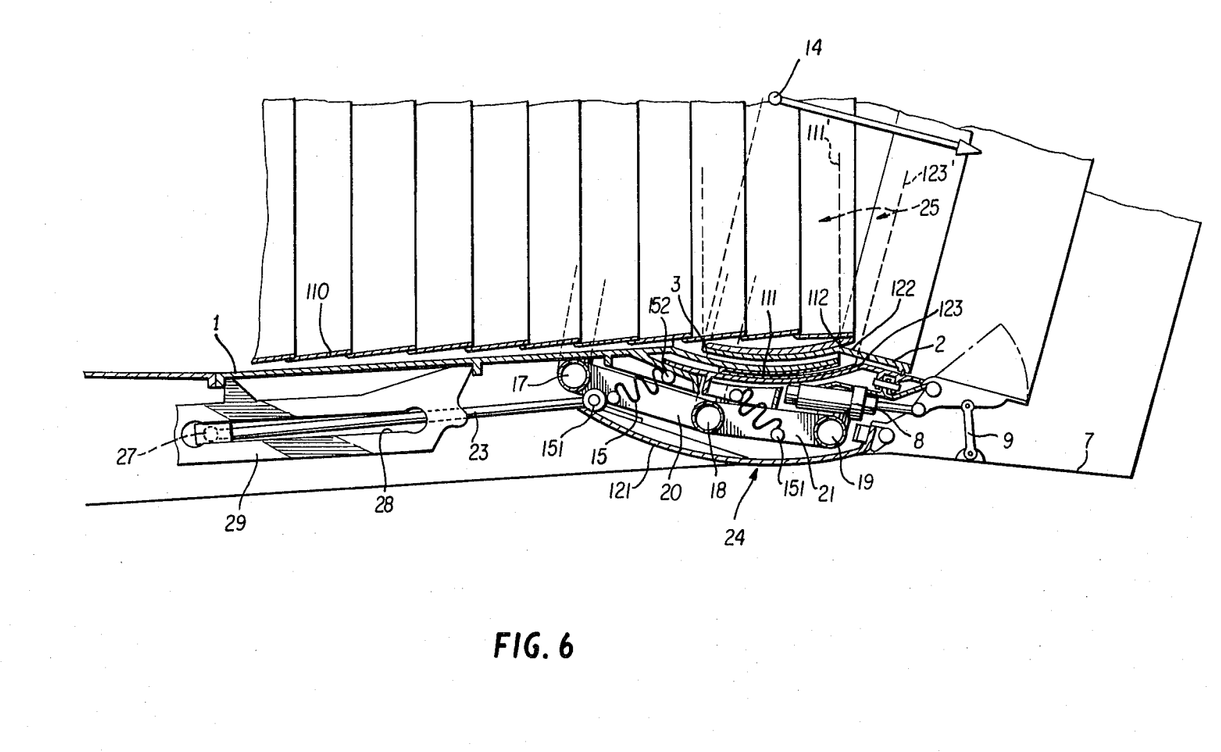
FIG. 6 is a partial longitudinal section according to the second embodiment in a position such that the jet is turned downward.
Figure 7:
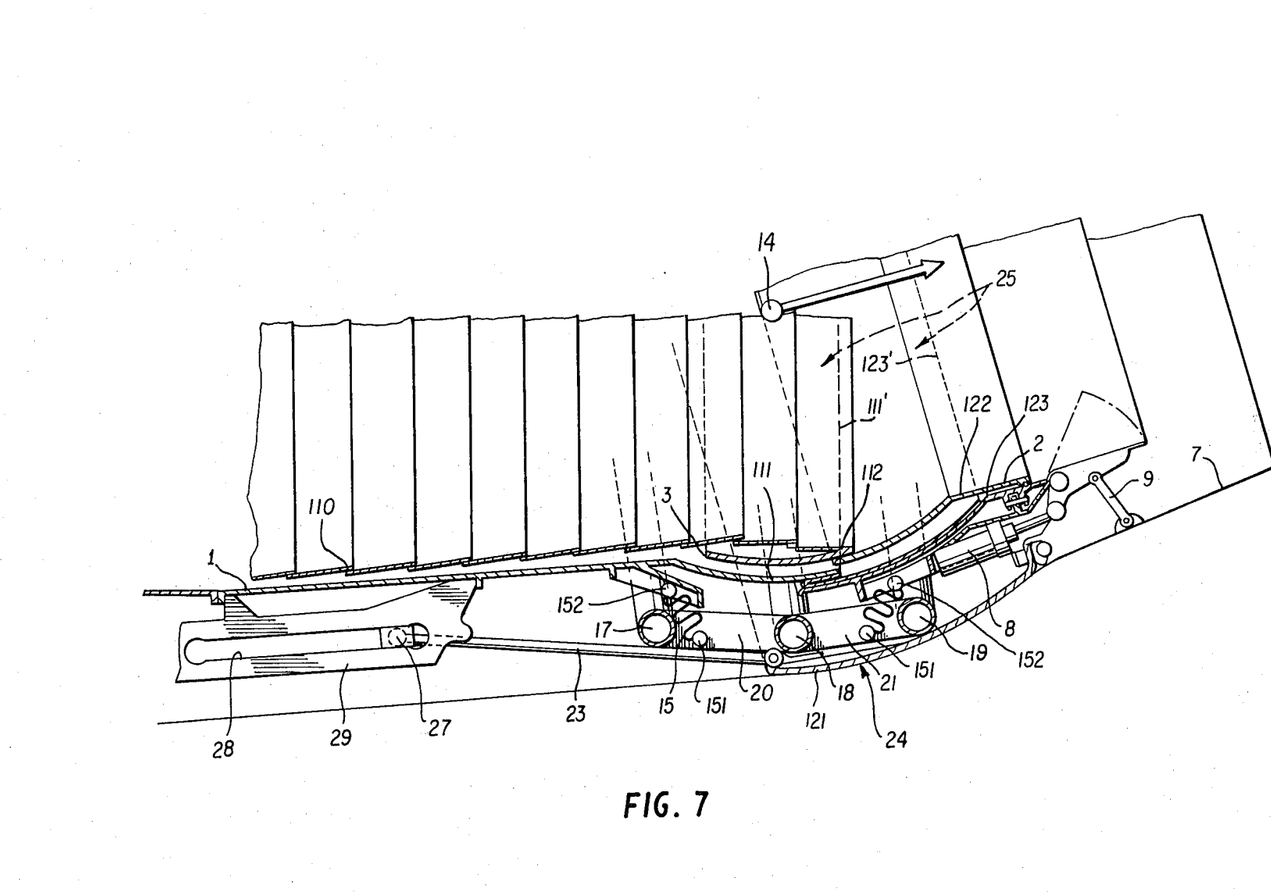
FIG. 7 is a partial longitudinal section according to the embodiment in a position such that the jet is turned upward.
Figure 8:
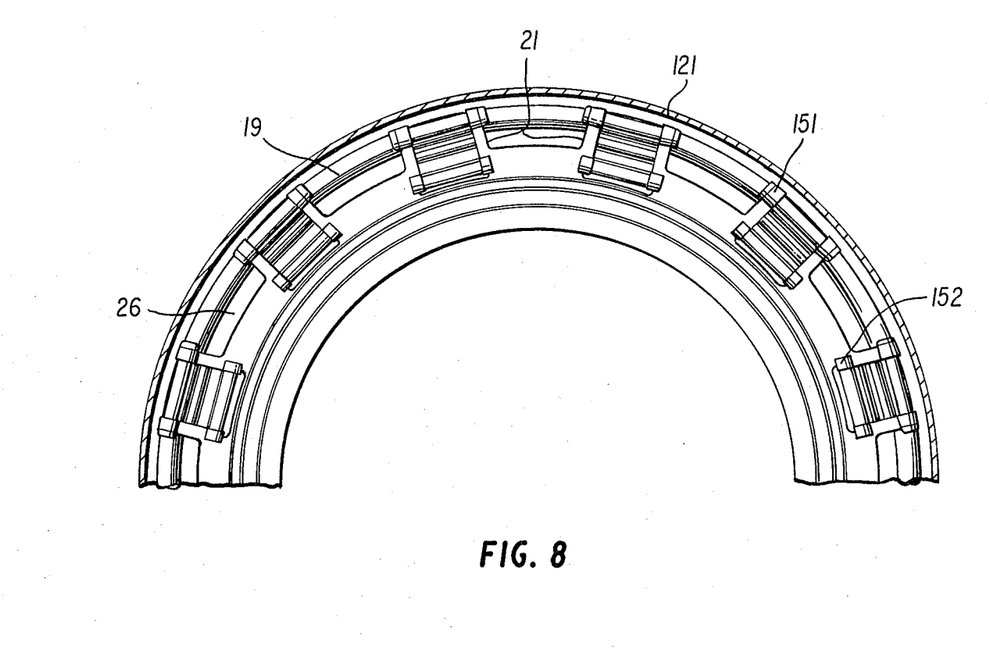
FIG. 8 is a partial half-section along VIII—VIII in FIG. 5.

In FIGS. 5 to 8 a second embodiment has been shown in which the elastic elements consist of corrugated metal strips 15. These elastic strips are grouped in two's, connected by an end edge to an intermediate connecting ring. The free ends are fixed respectively on the fixed part 1 and the pivoting part 2 of the nozzle. These pairs of elastic elements are uniformly distributed in the circumference of the nozzle as shown in FIG. 8. The intermediate connecting ring 24 has the form of a "squirrel cage" and consists in the example shown of three rings 17, 18, 19 the planes of which are parallel, joined by cross-bars such as 20, 21 respectively. The connections of the elastic elements on the fixed part and the mobile part of the nozzle are indicated by reference number 152. In the example shown, for the ring 17 a diameter was chosen slightly below that of the rings 18 and 19 in order to give the intermediate ring a generally rounded shape, like a shell.

Figure 5:
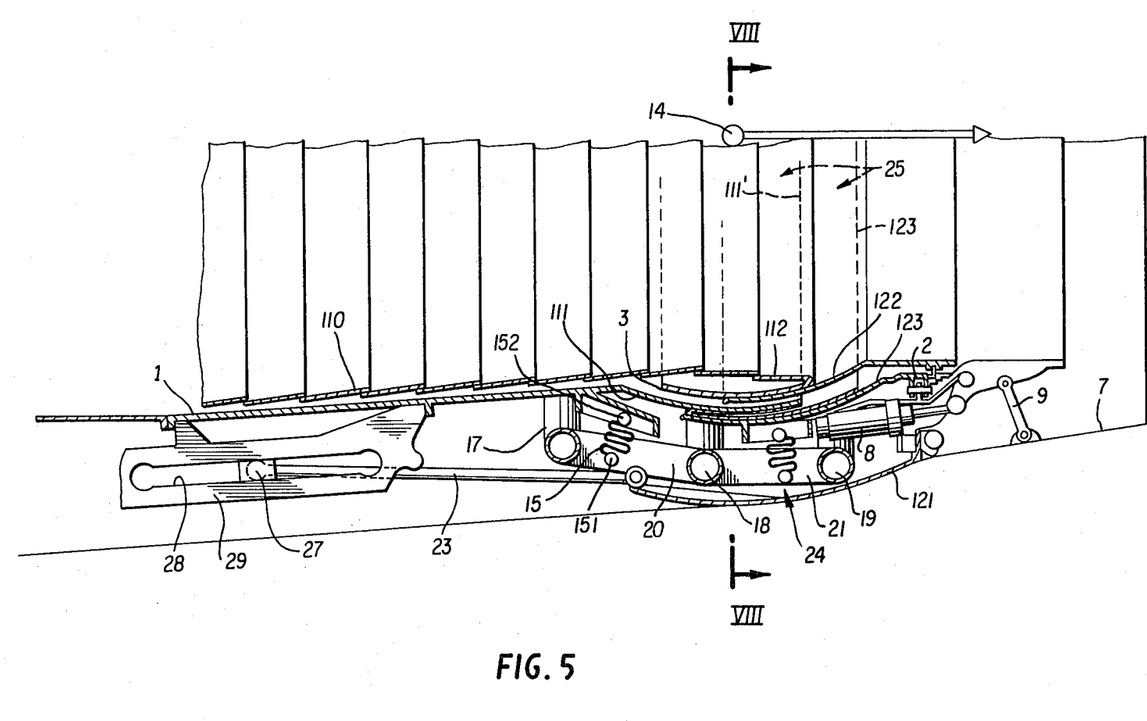
FIG. 5 is a partial longitudinal section of a steerable propulsion system nozzle according to a second embodiment of the invention, the axis of the steerable nozzle being in the axis of the propulsion system.

In the configuration of FIG. 5, the general extension planes of the elastic plates converge towards the axis of the nozzle. The pitch of the corrugations is selected in an appropriate manner according to the stress imposed by movements of the nozzle.

In the illustration of this second embodiment, it was decided to place the connections of the shafts 23 assuring steering of the nozzle on an external extension 121 of the pivoting part 2 of the nozzle.

This arrangement offers the advantage of articulating the shafts 23 on the upstream portion of part 2, thus making the passage of the shafts easier and causing the stress to pass through the external envelope of the mobile part.

Out of the same concern for reducing bending strain in the jack shafts, the embodiment shown in FIGS. 5, 6 and 7 shows that the point of articulation 27 of the shafts 23 on the actuator or jack is able to slide in a groove 28 made in a rigid cheek 29 solid with the fixed part 1.

The nozzle is provided with a tightening mechanism. Here they consist, first, of a collar with a spherical tightness surface 3 borne by the far periphery 112 of the internal sleeve 110 of the ejection duct and cooperating with the far internal edge 122 of the mobile part, and, second, of an annular membrane 25.

This annular tightening membrane 25 is folded according to a closed undulation on the upstream side. One of its sides 111' is fixed onto the extension 111 of the end of the fixed part 1 of the nozzle, and the other side 123' is solid on at least part of its width with the internal extension 123 of the pivoting part 2 of the nozzle.

Figure 9A:
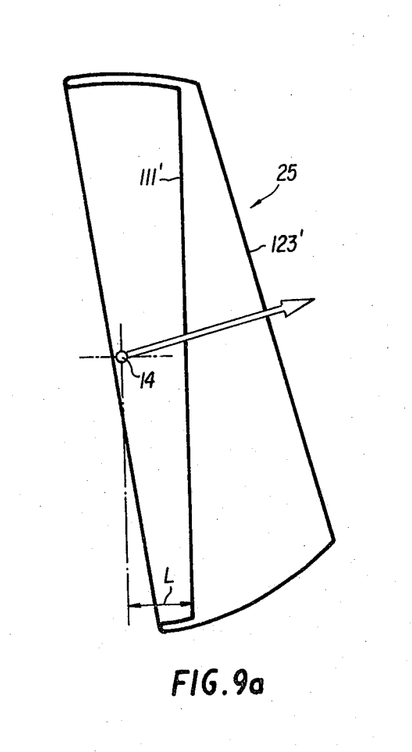
FIGS. 9a, 9b and 9c show a detailed view of the configurations taken on by sealing ring membrane, cut along a longitudinal plane, in the various positions of the mobile nozzle shown in FIGS. 5, 6 and 7.
Figure 9B:
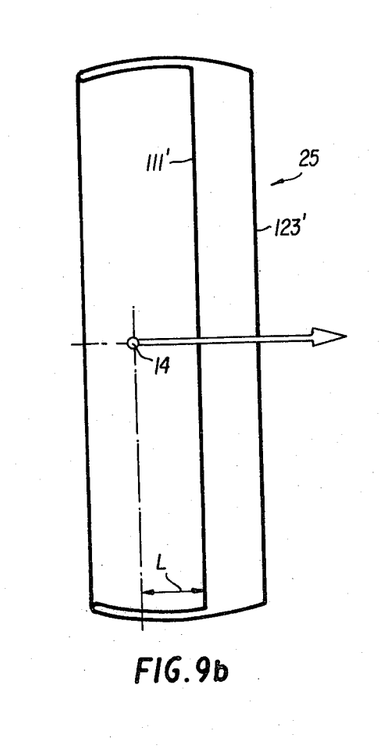
Figure 9C:
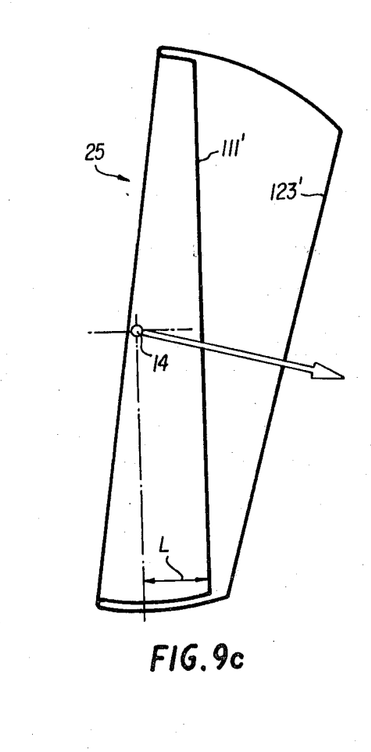

FIGS. 9a, 9b, 9c show respectively the configurations taken by half the annular tightness membrane 25 when the steering nozzle is in the jet-upward position, in the axis of the propulsion system, and in the jet-downward position.

At 14 is represented the axis of the propulsion system around which the pivoting part of the nozzle swivels. It will be noted that the distance L from this point to the edge 111' integral with the fixed part remains the same in all three movement configurations of the membrane. Also seen in the configurations shown in FIGS. 6 and 7 is the movement of the membrane, shown by the shaded area, when the mobile nozzle is turned upward or downward.

In the transversal-section view in FIG. 8, which moves in an intermediate plane between the rings 18 and 19, it can be seen that the cheeks of the cross-bar 21 of the intermediate connecting ring create notches 26 in correspondence with the intervals separating the elastic elements.

Jacks 8 belong to a device for modifying the section of the jets, with flaps 7 and rod 9, which is of a type analogous to that described in connection with the first embodiment.

The elastic elements are placed in an annular duct swept by relatively cool air. In the manner known for ventilation of a post-combustion duct, a judicious choice for a compressor stage is provided for, from which this air is taken.

Of course, this embodiment of the intermediate connecting ring described is not limiting. Hence, it might include only two rings 17-19. These two rings could be interlocking and detachable to facilitate changing the elastic elements. This intermediate connecting element could, finally, be used in a variant making use of laminated units.

The FIGURES show only two positions of the mobile nozzle corresponding to jet upward or jet downward. The double sets arranged at 90° from those shown allow the jet to be turned to the right or to the left. The combination of jack movements in two perpendicular planes allows the nozzle to be steered in virtually any direction.

The thrust-vectoring nozzle according to the invention has many advantages over the mechanical articulations used up to the present. Thus, it is:

less expensive due to the small number of mobile parts and to its being made of inexpensive materials, and to the ease of replacement of the elastic elements;

heavy, lighter, with fewer parts, of a less dense material;

and more reliable: there are no joints with play, and the laminated materials used for the elastic elements make use of well-known technology.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thrust-vectoring nozzle for a jet propulsion system comprising:
    a first fixed part connected with the propulsion system;
    a second pivoting part pivotably mounted on said fixed part;
    an intermediate connecting ring;
    tightening means arranged between the fixed part and the pivoting part;
    at least one control jack for moving the pivoting part operably associated therewith; and
    a multidirectional steering device comprising separated elastic elements arranged between the fixed part and the pivoting part of the nozzle, each elastic element further comprising two essentially parallel extended ends, the multidirectional steering device further comprising at least three sets wherein each set comprises two of said elements, uniformly distributed at the periphery of the nozzle, one of the ends of the elastic elements being integral with said intermediate connecting ring independent of the fixed part and pivoting part, the other end of each of the two elements being affixed on the fixed part and the pivoting part, respectively, of the nozzle.

2. A thrust-vectoring nozzle according to claim 1, the two-element sets comprising a flexible articulation mechanism comprising two planes of elastic elements, a first of which is fixed on the fixed part and a second of which is fixed on the pivoting part of the nozzle.

3. A thrust-vectoring nozzle according to claims 1 or 2, the multidirectional steering device further comprising at least three double sets of the two elastic elements and a control jack operably associated with each double set and arranged in a diametric plane equidistant from the sets.

4. A thrust-vectoring nozzle according to claims 1 or 2, the elastic elements comprising a stack of elastomer leaves and metal leaves adhering to one another.

5. A thrust-vectoring nozzle according to claim 4, the elastic elements comprising a rubber/light-alloy vulcanized laminate.

6. A thrust-vectoring nozzle according to claims 1 or 2, the elastic elements having the shape of a cylindrical-sector portion in a plane perpendicular to the axis of the propulsion system.

7. A thrust-vectoring nozzle according to claims 1 or 2, wherein the axes of each element in a set intersect at a point located inside the nozzle on the axis of the propulsion system.

8. A thrust-vectoring nozzle according to claims 1 or 2 or 3, the elastic elements comprising corrugated metal sheets.

9. A thrust-vectoring nozzle according to claims 1 or 2, the intermediate connecting ring having the shape of a squirrel cage consisting of at least two rings, the planes of which are essentially perpendicular to the axis of the propulsion system and joined by cross-bars uniformly distributed at their periphery.

10. A thrust-vectoring nozzle according to claims 1 or 2, the tightening means comprising at least one collar having a spherical face arranged at the periphery of the end of the fixed part and cooperating with the pivoting part and a spherical part of the nozzle, such parts having the same radius and center of curvature.

11. A thrust-vectoring nozzle according to claims 1 or 2, the tightening means comprising at least one flexible membrane fixed between the edges of the fixed and pivoting parts of the nozzle.

* * * * *